United States Patent
Zhou et al.

(10) Patent No.: US 12,044,804 B2
(45) Date of Patent: Jul. 23, 2024

(54) RANGE ESTIMATION FOR LiDAR SYSTEMS USING A DETECTOR ARRAY

(71) Applicant: BEIJING VOYAGER TECHNOLOGY CO., LTD., Beijing (CN)

(72) Inventors: Qin Zhou, Mountain View, CA (US); Yonghong Guo, Mountain View, CA (US); Youmin Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 712 days.

(21) Appl. No.: 17/015,030

(22) Filed: Sep. 8, 2020

(65) Prior Publication Data
US 2022/0075036 A1    Mar. 10, 2022

(51) Int. Cl.
G01S 7/4863    (2020.01)
G01S 17/18    (2020.01)
G01S 17/46    (2006.01)
G01S 17/931    (2020.01)

(52) U.S. Cl.
CPC .......... *G01S 7/4863* (2013.01); *G01S 17/46* (2013.01); *G01S 17/18* (2020.01); *G01S 17/931* (2020.01)

(58) Field of Classification Search
CPC ......... G01S 7/4863; G01S 17/46; G01S 17/18
See application file for complete search history.

(56) References Cited

U.S. PATENT DOCUMENTS

| | | | | |
|---|---|---|---|---|
| 5,130,543 A | * | 7/1992 | Bradbeer | G01S 3/783 250/342 |
| 6,094,270 A | * | 7/2000 | Uomori | G01S 17/46 356/623 |
| 6,876,392 B1 | * | 4/2005 | Uomori | G01S 17/89 348/370 |
| 10,605,932 B1 | * | 3/2020 | Newman | G01T 3/00 |
| 2011/0246137 A1 | * | 10/2011 | Vilim | G01T 7/00 702/181 |
| 2015/0293228 A1 | * | 10/2015 | Retterath | G01S 17/10 356/5.01 |
| 2021/0255323 A1 | * | 8/2021 | Lundquist | G01S 17/42 |

OTHER PUBLICATIONS

Thomas L. Lago, "Digital Sampling According to Nyquist and Shannon", Sound and Vibration, Feb. 2002 (Year: 2002).*

* cited by examiner

*Primary Examiner* — Yuqing Xiao
*Assistant Examiner* — Zhengqing Qi
(74) *Attorney, Agent, or Firm* — BAYES PLLC

(57) ABSTRACT

Embodiments of the disclosure provide a range estimation system for the optical sensing system. The exemplary range estimation system includes an optical detector array configured to receive a laser pulse returned from an object. The optical detector array includes a plurality of detector elements each configured to measure an intensity of the returned laser pulse. The range estimation system further includes a processor. The processor is configured to calculate an intensity-related value based on the intensities of the returned laser pulse measured using the optical detector array. The processor is further configured to determine a traveling time of the laser pulse based on the calculated intensity-related value. The processor is also configured to estimate a range between the object and the optical sensing system based on the traveling time of the laser pulse.

20 Claims, 6 Drawing Sheets

| Intensity Ratio | α (Degree) |
|---|---|
| ... | ... |
| 0.1 | 0.01 |
| 0 | 0.02 |
| -0.1 | 0.03 |
| ... | ... |

FIG. 5A

| Intensity Ratio | α (Degree) |
|---|---|
| ... | ... |
| 0.1 | 0.11 |
| 0 | 0.12 |
| -0.1 | 0.13 |
| ... | ... |

FIG. 5B

RANGE ESTIMATION FOR LiDAR SYSTEMS USING A DETECTOR ARRAY

TECHNICAL FIELD

The present disclosure relates to range estimation for a light detection and ranging (LiDAR) system, and more particularly to, LiDAR range estimation based on intensity information of a returned laser pulse measured using an optical detector array.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a detector or a detector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

A LiDAR system typically includes a transmitter to emit a laser pulse to an object. The laser pulse is backscattered and returned by the object, and the returned laser pulse is received by a LiDAR receiver. The LiDAR receiver typically includes an optical detector to convert the returned laser pulse into an electrical signal. The analog electrical signal is then converted into a digital signal by an analog-to-digital convertor (ADC). The distance to the object (also referred to as the "range") can be estimated based on a traveling time of the laser pulse and the speed of light.

Conventional range estimation methods rely on accurate determination of the traveling time of the laser pulse. The traveling time is determined by a time difference between an arrival time of the returned laser pulse and an emitting time of the laser pulse. Arrival time typically refers to the time when a peak of the laser pulse arrives at the receiver. To accurately determine the arrival time of its peak, some existing range estimation methods use a high-speed ADC to sample the returned laser pulse at a high frequency so that it can reconstruct a waveform of the returned laser pulse. However, the high-speed ADC is much more expensive than an ADC with a low sampling rate. Further, the high-speed ADC may cause substantial noises during operation of the optical sensing system.

Embodiments of the disclosure provide an improved range estimation of optical sensing systems such as LiDAR systems using intensity information of the returned laser pulse received by an optical detector array.

SUMMARY

Embodiments of the disclosure provide a range estimation system for an optical sensing system. The exemplary system includes an optical detector array configured to receive a laser pulse returned from an object. The optical detector array includes a plurality of detector elements each configured to measure an intensity of the returned laser pulse. The range estimation system further includes a processor. The processor is configured to calculate an intensity-related value based on the intensities of the returned laser pulse measured using the optical detector array. The processor is further configured to determine a traveling time of the laser pulse based on the calculated intensity-related value. The processor is also configured to estimate a range between the object and the optical sensing system based on the traveling time of the laser pulse.

Embodiments of the disclosure also provide a range estimation method for an optical sensing system. The exemplary method includes receiving, by an optical detector array including a plurality of detector elements, a laser pulse returned from an object. The exemplary method further includes measuring an intensity of the laser pulse by each detector element of the optical detector array. The exemplary method also includes calculating an intensity-related value, by a processor, based on the intensities of the returned laser pulse measured using the optical detector array. The exemplary method additionally includes determining, by the processor, a traveling time of the laser pulse, by the processor, based on the calculated intensity-related value. The exemplary method further includes estimating, by the processing, a range between the object and the optical sensing system, by the processor, based on the traveling time of the laser pulse.

Embodiments of the disclosure further provide an optical sensing system. The exemplary optical sensing system includes a scanner configured to transmit an emitted laser pulse towards an object and reflect the laser pulse returned from the object to an optical detector array. The exemplary optical sensing system further includes the optical detector array. The optical detector array includes a plurality of detector elements each configured to measure an intensity of the returned laser pulse. The exemplary optical sensing system also includes a processor. The processor is configured to calculate an intensity-related value based on intensities of the returned laser pulse. The processor is further configured to determine a traveling time of the laser pulse based on the calculated intensity-related value. The processor is also configured to estimate a range between the object and the optical sensing system based on the traveling time of the laser pulse.

It is to be understood that both the foregoing general description and the following detailed description are exemplary and explanatory only and are not restrictive of the invention, as claimed.

BRIEF DESCRIPTION OF THE DRAWINGS

FIGS. 5A-5B each illustrates an exemplary look-up table for determining the included angle using a calculated intensity ratio, according to embodiments of the disclosure.

DETAILED DESCRIPTION

Figure 1:
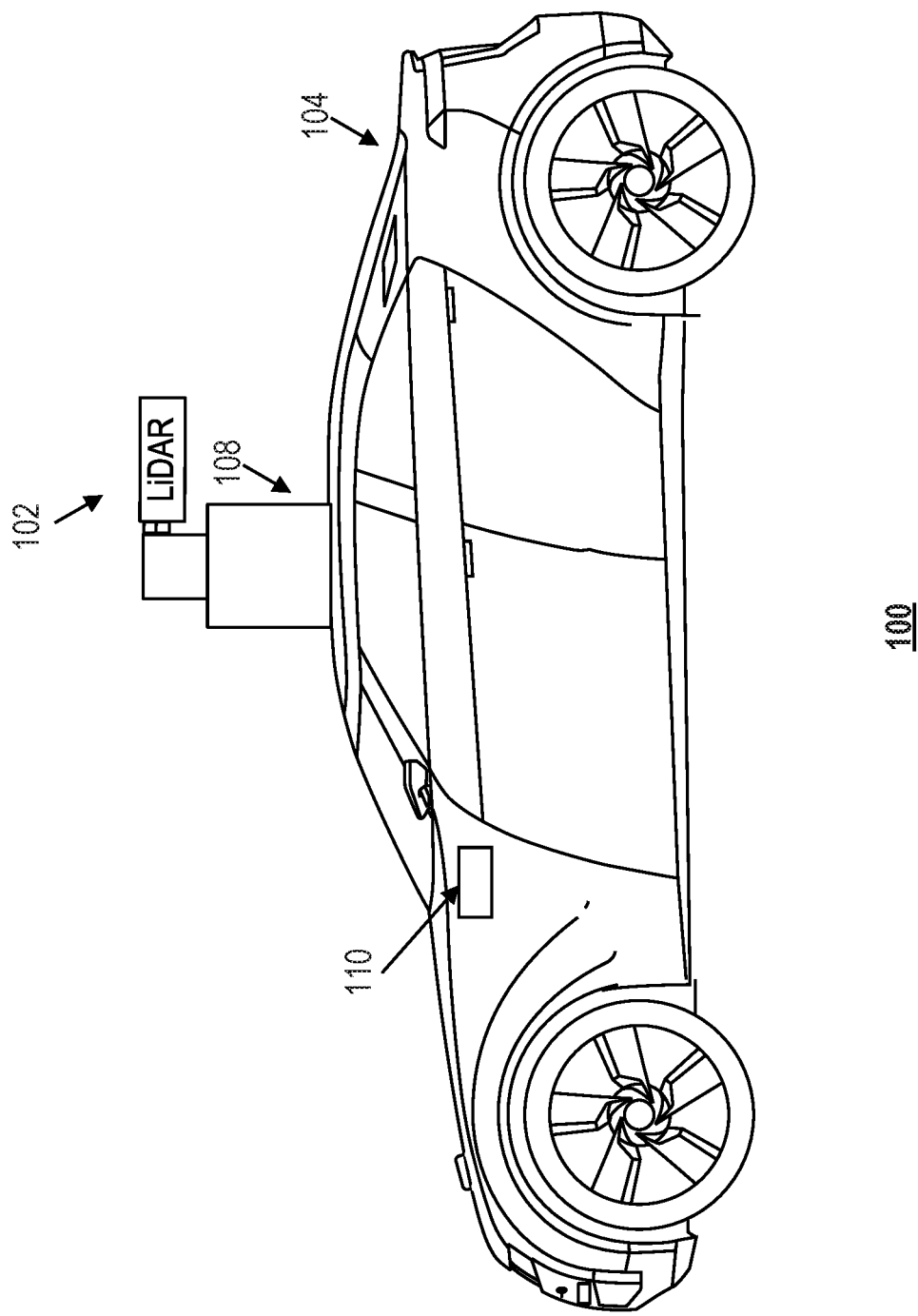
FIG. 1 illustrates a schematic diagram of an exemplary vehicle equipped with a LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for automatically estimating a range between an object and an optical sensing system (e.g., a LiDAR system). In some embodiments, the optical sensing system may include a transmitter configured to emit a pulsed light beam (e.g., laser pulse) towards the object. For example, a laser source of the transmitter may emit a laser pulse toward a scanner of the transmitter. In some embodiments, the scanner may include a scanning mirror rotating around a rotation axis and reflecting the laser pulse to a range of directions at time point $t_1$. The laser pulse is then backscattered and returned from the object. The scanner may receive the returned laser pulse at time point $t_2$. A time difference between time points $t_2$ and $t_1$ (e.g., $\delta t = t_2 - t_1$) is a traveling time of the laser pulse.

In some embodiments, the scanner may rotate for an angle during the time span of $\delta t$ and accordingly, the returned laser pulse reflected by the scanner at time point $t_2$ and the incident laser pulse emitted towards the scanner at time point $t_1$ form an included angle. Because the included angle is proportional to the traveling time $\delta t$, which is in turn proportional to the range between an object and an optical sensing system, the range can be estimated based on the included angle. In order to determine the included angle, in some embodiments, a detector array in the receiver may be used to determine the direction of the reflected laser pulse. The detector array may measure intensities of the reflected laser pulse received on a plurality of detector elements. For example, the reflected laser pulse may be received by multiple adjacent detector elements of the detector array, and each of the detector elements generates an electrical signal reflecting the received intensity value. An ADC may convert the electrical signals into digital signals for estimating the range.

In some embodiments, the optical sensing system may also include a processer configured to calculate an intensity-related ratio based on the intensity information received from the ADC. The processor may then map the calculated intensity-related ratio to the included angle, e.g., using a selected pre-computed look-up table. The processor may further determine traveling time $\delta t$ based on the determined included angle. The processor may determine a distance between the object and the optical sensing system based on the determined traveling time of the laser beam.

By automatically estimating the range between the object and the optical sensing system using intensity information of the returned laser pulse measured using an optical detector array, embodiments of the present disclosure therefore not only improve the range estimation for the optical sensing system but also reduce the system manufacturing cost. For example, a system implementing the disclosed range estimation method no longer relies on a high-speech ADC (e.g., 1 GHz) to provide detailed waveform information of the returned laser pulse. The system may use a detector array and a low-cost ADC (e.g., an ADC sampling rate as low as a pulse emitting rate of the laser source, such as 1 MHz) to obtain an accurate range estimation. Further, because the low sampling rate ADC generates less sampling data comparing with a high sampling rate ADC, the disclosed range estimation systems and methods can save computational power (e.g., speeding up the LiDAR system processing speed). The disclosed optical sensing system can be used in many applications. For example, the improved optical sensing system can be used in advanced navigation technologies, such as to aid autonomous driving or to generate high-definition maps, in which the optical sensing system can be equipped on a vehicle.

For example, FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with pulsed laser beams and measuring the reflected/scattered pulses with a receiver. The laser beams used for LiDAR system 102 may be ultraviolet, visible, or near infrared. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time range is known as a data frame.

Figure 2:
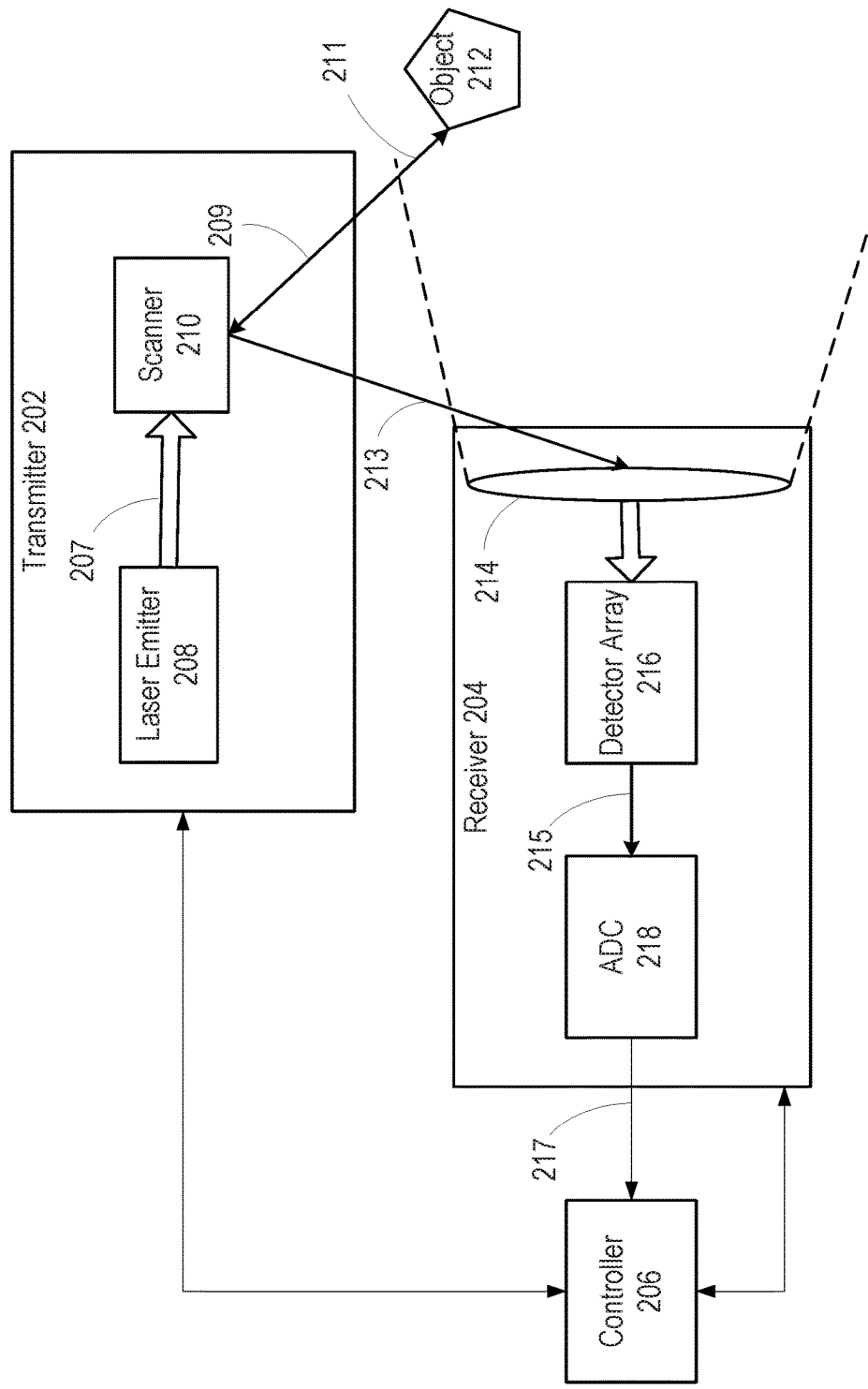
FIG. 2 illustrates a block diagram of an exemplary LiDAR system, according to embodiments of the disclosure.

FIG. 2 illustrates a block diagram of an exemplary LiDAR system 102, according to embodiments of the disclosure. LiDAR system 102 may include a transmitter 202, a receiver 204, and a controller 206. Transmitter 202 may emit optical beams (e.g., pulsed laser beams) along multiple directions. Transmitter 202 may include one or more laser sources (e.g., a laser emitter 208) and a scanner 210. Transmitter 202 can sequentially emit a stream of pulsed laser beams in different directions within a scan field of view (FOV) (e.g., a range in angular degrees), as illustrated in FIG. 2.

Laser emitter 208 may be configured to provide laser beam 207 (also referred to as "native laser beam") to scanner 210. In some embodiments of the present disclosure, laser emitter 208 may generate pulsed a laser beam in the ultraviolet, visible, or near infrared wavelength range. In some embodiments of the present disclosure, laser emitter 208 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser emitter may be used as laser emitter 208 for emitting laser beam 207.

Scanner 210 may be configured to emit laser beam 209 to an object 212 in a range of scanning angles (collectively forming the FOV of transmitter 202). For example, scanner 210 may include a scanning mirror oscillated around a ration axis (not shown) at a constant or varying angular velocity. As a result of the rotation, scanner 210 may reflect incident light beams to different directions. At each time point during the scan, the scanning mirror may reflect laser beam 207 generated by laser emitter 208 to the desired direction, which becomes laser beam 209. The laser pulse in laser beam 209 may have the same waveform (e.g., bandwidth and wavelength) as that in laser beam 207. In some embodiments, scanner 210 may also include other optical components (e.g., lenses) that can focus pulsed laser light into a narrow laser beam to increase the scan resolution and the range to scan object 212. In some embodiments, object 212 may be made of a wide range of materials including, for example, non-metallic objects, rocks, rain, chemical compounds, aerosols, clouds and even single molecules.

Upon contact, laser beam 209 can be reflected/scattered by object 212 via backscattering, such as Rayleigh scattering, Mie scattering, Raman scattering, and fluorescence. As shown in FIG. 2, object 212 may reflect the laser pulse in laser beam 209 back to scanner 210 in a laser beam 211. Scanner 210 may further be configured to receive laser beam 211 returned from object 212. Scanner 210 may further reflect the laser pulse to receiver 204, which becomes a laser beam 213. During the traveling time of the laser pulse in laser beam 209 from scanner 210 to object 212 and then in laser beam 211 from object 212 back to scanner 210, scanner 210 has rotated to a different angle. As a result, laser beam 213 is reflected by scanner 210 to a different direction than laser beam 209. The included angle between laser beam 209 and laser beam 213 therefore is proportional to the traveling time, and thus encoding the range information.

In some embodiments, receiver 204 may be configured to collect laser beam 213 reflected from scanner 210 and output electrical signals indicating the intensity of the returned laser pulse in laser beam 213. As illustrated in FIG. 2, receiver 204 may include a lens 214, a detector array 216, and an ADC 218. Lens 214 may be configured to collect laser beam 213 reflected by scanner 210 and converge it to a light spot before being detected by detector array 216.

Detector array 216 may be configured to detect the laser pulse in laser beam 213 reflected by scanner 210 and converged by lens 214. In some embodiments, detector array 216 may include a plurality of detector elements positioned adjacent to each other forming an optical sensing area. Depending on the traveling direction of laser beam 213, the converged light spot of laser beam 213 may be received by one or multiple detector elements at a different location of detector array 216. The detector elements may be individually addressed such that the direction of laser beam 213 (and accordingly the included angle) can be determined according to the particular location of detector array 216 that receives the light spot.

Each detector element of detector array 216 may measure an intensity of the received light spot and convert the measurement into an electrical signal (e.g., a current or a voltage signal). For example, an electrical signal 215 may be an analog signal which is generated when photons are absorbed by a detector element of detector array 216. In some embodiments, each detector element of detector array 216 may include a PIN detector, an avalanche photodiode (APD) detector, a single photon avalanche diode (SPAD) detector, a silicon photo multiplier (SiPM) detector, or the like. In some embodiments, detector array 216 may include a position sensitive device (PSD).

ADC 218 may be configured to digitize electrical signals generated by detector array 216. For example, ADC 218 may convert electrical signals 215 into a digital signal 217 (e.g., data points representing intensities measured using detector elements of detector array 216 at a sampling time point). Digital signal 217 may include zero values and non-zero values. If a detector element of detector array 216 does not receive the light spot of laser beam 213 at the sampling time point, the corresponding intensity measurement is a zero value. If a detector element of detector array 216 receives the light spot of laser beam 213 at the sampling time point, the corresponding intensity measurement is a non-zero value. Consistent with the present disclosure, the sampling rate of ADC 218 can be as low as the pulse rate (e.g., as long as no multiple pulses are sampled in one measurement). For example, if the pulse rate used in LiDAR system 102 is around 1 MHz, ADC 218 may have a sampling frequency as low as 1 MHz.

Digital signal 217 may be transmitted to controller 206 to be processed and analyzed. For example, controller 206 in LiDAR system 102 may include a processor to determine the distance to object 212 from LiDAR system 102 based on digital signal 217 (e.g., the intensity measurements from detector array 216) and data of scanner 210 (e.g., an angular velocity of the scanning mirror of scanner 210). In particular, the distance can be determined based on the traveling time of the laser pulse emitted by transmitter 202. In some alternative embodiments, digital signal 217 may be transmitted to and processed by a separate signal processor at a different location but communicating with controller 206 through a network (not shown). For example, the separate signal processor may be in a cloud or may be alternatively in a single location (such as inside a mobile device) or distributed locations.

In some embodiments, controller 206 may be configured to estimate the range based on the traveling time of the laser pulse. The traveling time of the laser pulse may be determined based on intensity information included in digital signal 217. For example, controller 206 may calculate an intensity-related value using the intensity information. Controller 206 may further determine an included angle based on the intensity-related value using a pre-computed look-up table stored in controller 206. The included angle is caused by the rotation of the scanning mirror in scanner 210 during the traveling time of the laser pulse. In some embodiments, controller 206 may further determine the traveling time of the laser pulse based on the included angle between laser beam 209 and laser beam 213 and the angular velocity of the scanning mirror. In some embodiments, controller 206 may control the scanning mirror of scanner 210 to oscillate and rotate at a predetermined angular velocity. For example, the angular velocity of the scanning mirror may be determined by controller 206 or preprogrammed in controller 206. The angular velocity of the scanning mirror may be stored in controller 206 for determining the traveling time of the laser pulse.

Figure 3:
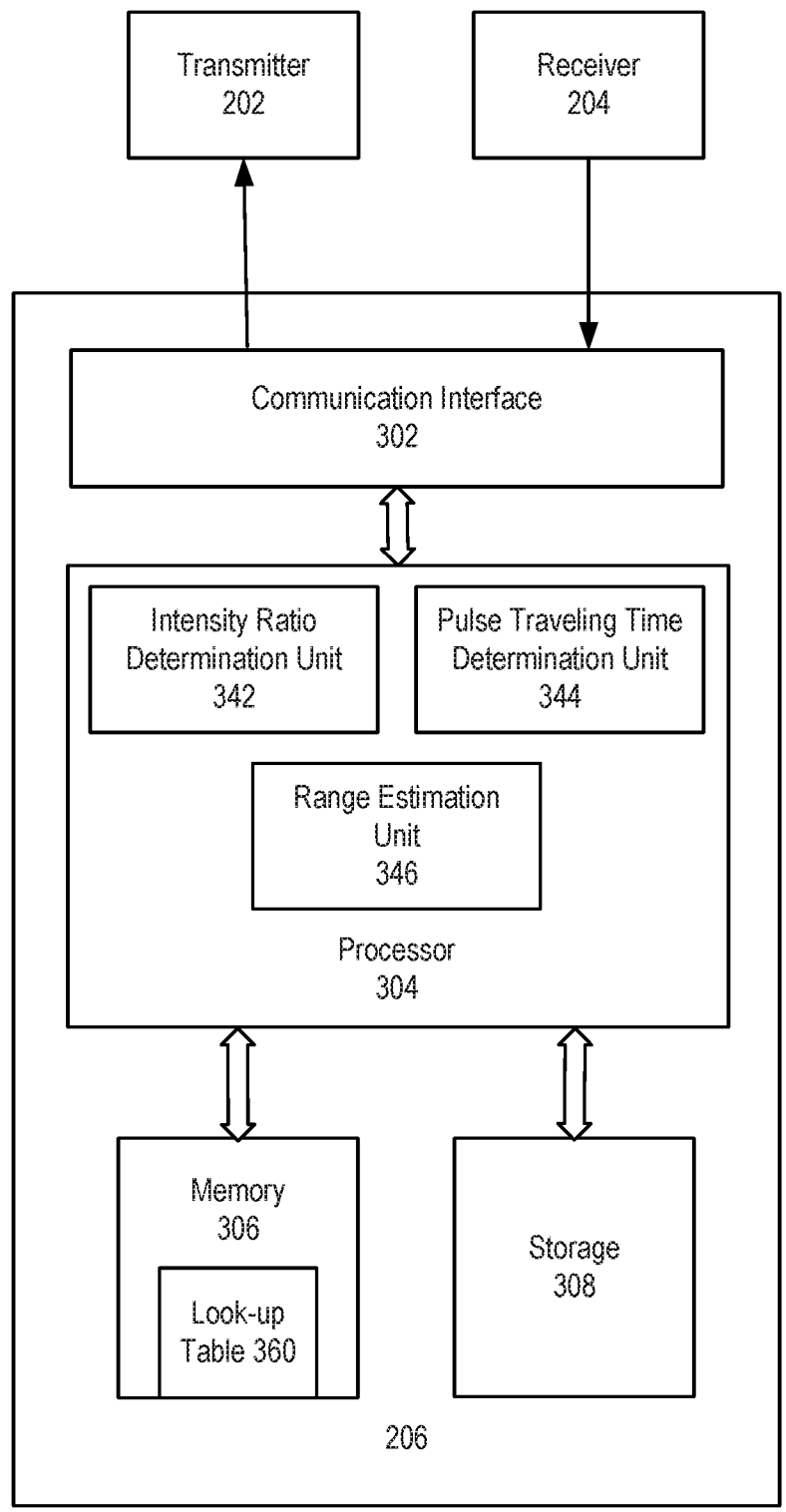
FIG. 3 illustrates a schematic diagram of an exemplary controller for estimating a range for a LiDAR system, according to embodiments of the disclosure.

FIG. 3 illustrates a schematic diagram of an exemplary controller 206 for estimating a range for a LiDAR system, according to embodiments of the disclosure. As shown by FIG. 3, controller 206 may include a communication interface 302, a processor 304, a memory 306, and a storage 308. In some embodiments, controller 206 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of controller 206 may be located in a cloud or may be alternatively in a single location (such as inside a mobile device) or distributed locations. Components of controller 206 may be in an integrated device or distributed at different locations but communicate with each other through a network (not shown). Consistent with the present disclosure, controller 206 may be configured to calculate the intensity-related value based on digital signal 217, determine the traveling time of the laser pulse based on the intensity-related value, and estimate the range between the object and the LiDAR system using the traveling time. In some embodiments, controller 206 may also perform various other control functions of other components of LiDAR system 102.

Communication interface 302 may send signals to and receive signals from components of transmitter 202 (such as scanner 210) and receiver 204 (such as ADC 218) via wired communication methods, such as Serializer/Deserializer (SerDes), Low-voltage differential signaling (LVDS), Serial Peripheral Interface (SPI), etc. In some embodiments, communication interface 302 may optionally use wireless communication methods, such as a Wireless Local Area Network (WLAN), a Wide Area Network (WAN), wireless networks such as radio waves, a cellular network, and/or a local or short-range wireless network (e.g., Bluetooth™), etc. In such an implementation, communication interface 302 can send and receive electrical, electromagnetic or optical signals in analog form or in digital form.

Consistent with some embodiments, communication interface 302 may receive digital signal 217 indicative of the intensity values of the laser pulse measured using detector array 216. Communication interface 302 may provide control signals to scanner 210 for controlling rotation speed of the scanning mirror (e.g., angular velocity of the scanning mirror). Communication interface 302 may also receive acquired signals from and provide control signals to various other components of LiDAR system 102.

Processor 304 may include any appropriate type of general-purpose or special-purpose microprocessor, digital signal processor, or microcontroller. Processor 304 may be configured as a separate processor module dedicated to LiDAR range estimation, e.g., determining the range between the object and the LiDAR system based on the traveling time of the laser pulse and the data of the scanning mirror of scanner 210 (e.g., the angular velocity of the scanning mirror). Alternatively, processor 304 may be configured as a shared processor module for performing other functions of LiDAR controls.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform functions disclosed herein. For example, memory 306 and/or storage 308 may be configured to store program(s) that may be executed by processor 304 for LiDAR range estimation. In some embodiments, memory 306 and/or storage 308 may also store intermediate data such as intensities of the returned laser pulses detected by the detector elements, intensity-related values calculated based on the detected intensities, included angles between two reflected laser beams determined based on the intensity-related values, traveling times of the laser pulses determined based on the determined included angles, etc. In some embodiments, memory 306 and/or storage 308 may further store information and data used by processor 304. For instance, memory 306 and/or storage 308 may be configured to store pre-computed look-up tables for determining included angles between the laser beam emitted to and reflected by scanner 210 at a first time point and the returned laser beam reflected by scanner 210 again at a second time point (e.g., the angle between laser beam 209 and laser beam 213). The various types of data may be stored permanently, removed periodically, or disregarded immediately after each scan.

As shown in FIG. 3, processor 304 may include multiple modules, such as an intensity ratio determination unit 342, a pulse traveling time determination unit 344, and a range estimation unit 346, and the like. These modules can be hardware units (e.g., portions of an integrated circuit) of processor 304 designed for use with other components or software units implemented by processor 304 through executing at least part of a program. The program may be stored on a computer-readable medium, and when executed by processor 304, it may perform one or more functions. Although FIG. 3 shows units 342-346 all within one processor 304, it is contemplated that these units may be distributed among different processors located closely or remotely with each other.

Figure 4:
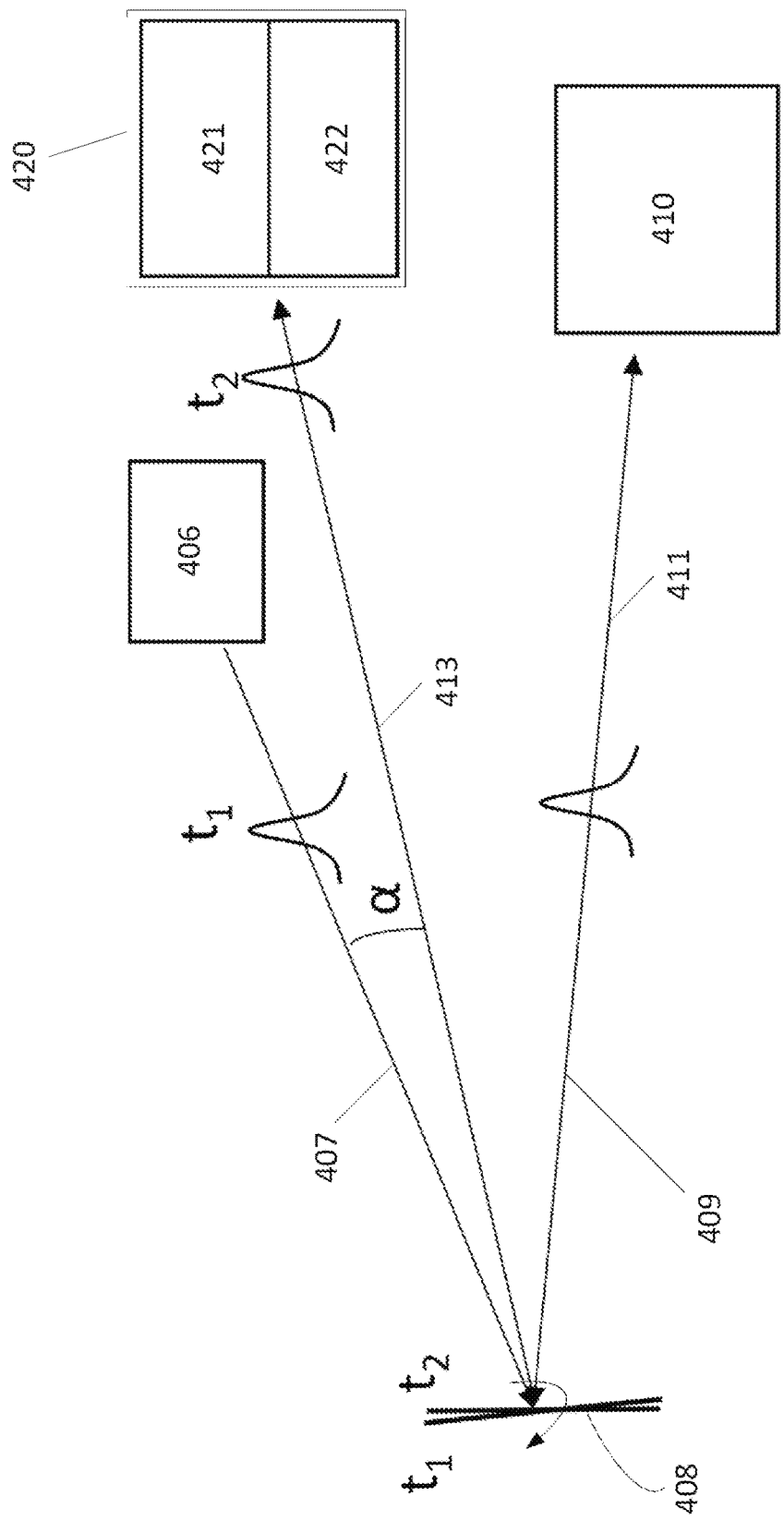
FIG. 4 illustrates exemplary light path of a laser pulse reflected by a scanner, according to embodiments of the disclosure.

FIG. 4 illustrates exemplary light path of a laser pulse reflected by a scanner, according to embodiments of the disclosure. As shown in FIG. 4, at time point $t_1$, a laser beam 407 containing a laser pulse is emitted by emitter 406 towards a scanning mirror 408 of a scanner (not shown). Scanning mirror 408 rotates around a rotation axis to a first rotation angle and reflects laser beam 407 (and the laser pulse therein) to form a laser beam 409 towards an object 410. The laser pulse in laser beam 409 is reflected by object 410 and travel back to scanning mirror 408 in laser beam 411. As shown in FIG. 4, laser beam 409 and laser beam 411 may in a same light path but in opposite directions. The laser pulse in laser beam 411 reaches scanning mirror 408 at time point $t_2$. During this travel time of the laser pulse (from $t_1$ to $t_2$), scanning mirror 408 rotates at its angular velocity. At time point $t_2$, scanning mirror 408 rotates to a second rotation angle and reflects the returned laser pulse in laser beam 411 towards a detector array 420 in laser beam 413. The laser pulse in laser beam 413 may be received by a detector array 420 of the receiver.

As shown in FIG. 4, detector array 420 includes two detector elements 421 and 422. In some embodiments, a light spot of the laser pulse may only reach the optical sensing area of detector element 421. For example, if a distance to object 410 from scanning mirror 408 is short, a traveling time of the laser pulse may be nearly zero (e.g., $t_2 \approx t_1$). As a result, laser beam 411 may reach scanning mirror 408 and be reflected to detector array 420 in the opposite direction of laser beam 407 emitted by emitter 406 at time point $t_1$. In some embodiments, because the distance to object 410 from scanning mirror 408 is long, the traveling time of the laser pulse cannot be ignored (e.g., $t_2 \neq t_1$). As a result, at time point $t_2$, scanning mirror may rotate to the second rotation angle and reflect the returned laser pulse to a different direction (e.g., laser beam 413). As shown in FIG. 4, the light spot of the laser pulse in laser beam 413 may reach both detector elements 421 and 422. For example, detector element 421 may receive a first part of light spot of the laser pulse and detector element 422 may receive a second part of the light spot of the laser pulse.

In some embodiments, detector array 420 may include more than two detector elements to receive a laser pulse returned from a distant object. It is to be understood that the distance to object 410 from scanning mirror 408 is proportional to included angle α as shown in FIG. 4. For example, when object 410 is at a farther distance away from scanning mirror 408, the traveling time of the laser pulse may become longer and included angle α may accordingly become larger. In another example, as shown in FIG. 4, if scanning mirror 408 rotates at a higher angular velocity, included angle α may also become larger. As a result, detector array 420 may need to include more detector elements to detect the returned laser pulse in laser beam 413.

In some embodiments, each detector element of detector array 216 may convert the received optical signal (e.g., laser beam 413) into an electrical signal (e.g., electrical signal 215) reflecting an intensity of the light spot falling on the detector element. For example, detector element 421 may convert the received light spot into a first electrical signal and detector element 422 may convert the received light spot into a second electrical signal. Consistent with some embodiments, the electrical signals may be converted into a digital signal (e.g., digital signal 217) by ADC 218. For example, the first electrical signal electrical generated by detector element 421 and the second electrical signal generated by detector element 422 may be converted into two data points by ADC 218. The first data point may include intensity information of the light spot of the laser pulse received on detector element 421 and the second data point may include intensity information of the light spot of the laser pulse received on detector element 422.

Returning to FIG. 3, intensity ratio determination unit 342 in processor 304 may be configured to process the data points generated by ADC 218. For example, as shown in FIG. 4, detector array 420 may detect intensities of the laser pulse received on the respective detector elements. The intensity values may be further digitized by ADC 218 and provided to controller 206. In some embodiments, intensity ratio determination unit 342 may calculate a difference between the first intensity value and the second intensity value. Consistent with the present disclosure, the first intensity value indicates the intensity of the laser pulse received on detector element 421 and the second intensity value indicates the intensity of the laser pulse received on detector element 422. Intensity ratio determination unit 342 may further calculate a sum of the first intensity value and the second intensity value. Intensity ratio determination unit 342 may then calculate a ratio between the calculated difference and the calculated sum. For example, the ratio can be calculated according to a formula of $(I_1-I_2)(I_1+I_2)$, where $I_1$ is the first intensity value and $I_2$ is the second intensity value.

Based on the ratio calculated by intensity ratio determination unit 342, pulse traveling time determination unit 344 in processor 304 may be configured to determine the traveling time of the laser pulse. In some embodiments, a look-up table may be created to map ratios to respective included angles α between laser beams 412 and 413. In one example, the look-up table (e.g., look-up table 360) may be pre-computed and stored in memory 306/storage 308 of controller 206 and retrieved by pulse traveling time determination unit 344. In another example, the look-up table may be stored and updated in a remote location and retrieved by controller 206 via communication interface 302 as needed.

In some embodiments, more than one look-up table may be pre-computed to determine included angle α. FIGS. 5A-5B each illustrates an exemplary look-up table that maps the included angles to the calculated ratios, according to embodiments of the disclosure. In some embodiments, different look-up tables may be created for different groups of detector elements in detector array 216. For example, if detector array 216 include three detector elements, at least two look-up tables may be pre-computed for determining included angle α. A first look-up table, such as the look-up table shown in FIG. 5A, may be determined to map included angle α to the intensity ratio when the light spot of the laser pulse reaches a first detector element and a second detector element of detector array 216. A second look-up table, such as the look-up table shown in FIG. 5B, may be determined to map included angle α to the intensity ratio when the light spot of the laser pulse reaches the second and third detector elements.

Pulse traveling time determination unit 344 may select a look-up table for use based on the group of detector elements that actually receives the light spot of the returned laser pulse. For example, the look-up table shown in FIG. 5A may be selected to map intensity ratios calculated based on intensities measured by the first two detector element of the detector array 216. In another example, the look-up table shown in FIG. 5B may be selected to map intensity ratios calculated based on intensities measured by the second detector element and the third detector element of the detector array 216.

In some embodiments, pulse traveling time determination unit 344 in processor 304 may further determine the traveling time of the laser pulse based on the determined included angle α as shown in FIG. 4. For example, a traveling time δt may be determined according to Equation (1):

$$\delta t = \alpha/2 \cdot \omega \quad (1)$$

where ω is the angular velocity of the scanning mirror. Value of ω may be predetermined and stored in memory 306/storage 308 of controller 206 or dynamically determined by control 206. Based on the traveling time of the laser pulse, range estimation unit 346 may determine the distance between the object and the LiDAR system. For example, the distance can be determined according to Equation (2):

$$d = \text{speed of light} \times \delta t/2 \quad (2)$$

In some embodiments, pulse traveling time determination unit 344 and range estimation unit 346 may be one unit, and the distance can be determined directly from the included angle α according to Equation (3):

$$d = \text{speed of light} \times \alpha/4 \cdot \omega \quad (3)$$

Figure 6:
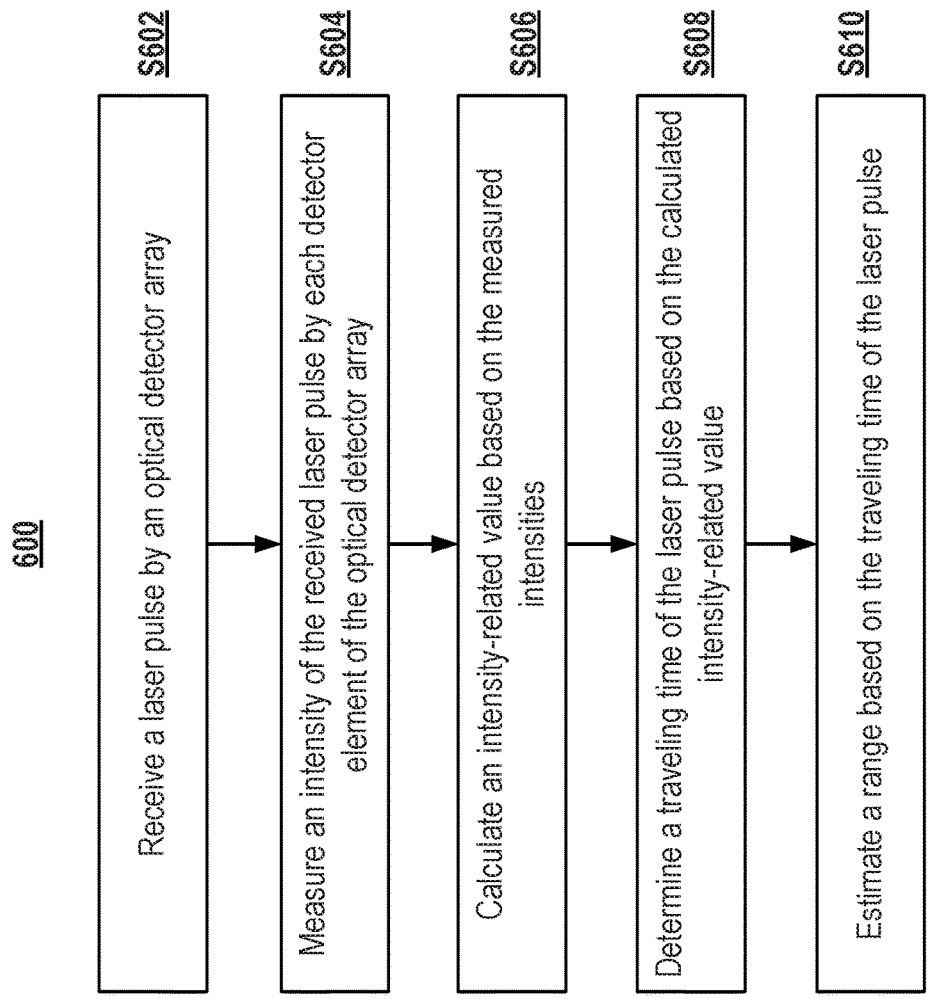
FIG. 6 is a flow chart of an exemplary method for estimating a range for a LiDAR system, according to embodiments of the disclosure.

FIG. 6 is a flow chart of an exemplary method 600 for estimating a range for a LiDAR system, according to embodiments of the disclosure. In some embodiments, method 600 may be performed by various components of LiDAR system 102, e.g., transmitter 202, receiver 204, and controller 206. In some embodiments, method 600 may include steps S602-S610. It is to be appreciated that some of the steps may be optional. Further, some of the steps may be performed simultaneously, or in a different order than shown in FIG. 6.

In step S602, detector array 216 in receiver 204 may receive a laser pulse reflected by scanner 210. Consistent with some embodiments, the laser pulse may be emitted by laser emitter 208 and reflected by scanner 210 towards object 212. Object 212 may reflect the laser pulse back to scanner 210. The returned laser pulse then may be reflected by scanner 210 and received by received 204. Lens 214 in receiver 204 may converge the received laser beam to a light spot and forward the light spot to detector array 216. Because detector array 216 may include a plurality of detector elements, the laser pulse may be received by one or multiple detector elements.

In step S604, each detector element may measure an intensity value of the laser pulse received on its optical sensing area. For example, each detector element may convert the received optical signal into an electrical signal indicative of the intensity of the received laser pulse. The electrical signal may further be digitized by ADC 218 in receiver 204. For example, ADC 218 may create data points to indicate intensity values of the laser pulse measured by the detector elements of detector array 216.

In step S606, processor 304 may calculate an intensity-related value (e.g., an intensity ratio) based on the intensity values measured in step S604. Processor 304 may calculate a difference between two non-zero intensity values. Processor 304 may further calculate a sum of the two non-zero intensity values. Processor 304 may calculate the intensity ratio by dividing the difference by the sum.

In step S608, processor 304 may determine a traveling time of the laser pulse based on the intensity ratio calculated in step S606. Processor 304 may determine an included angle and accordingly the traveling time of the laser pulse based on the determined included angle. In some embodiments, the included angle may be determined based on a pre-computed look-up table that maps intensity ratios to respective included angles. Different look-up tables (e.g., look-up tables shown in FIGS. 5A-5B) may be pre-computed for different groups of detector elements of detector array 216. For example, based on the group of detector elements that actually receives the light spot of the returned laser pulse, processor 304 may select a corresponding look-up table for determining the included angle. For example, processor 340 may look up the included angle mapped to the calculated intensity ratio using the selected look-up table. Processor 304 may then determine the traveling time of the laser pulse based on the determined included angle and the angular velocity of scanning mirror 408 according to Equation (1).

In step S610, processor 304 may estimate the range between the object and the LiDAR system. Processor 304 may determine the distance between the object and the LiDAR system using the traveling time and the speed of light. For example, because the laser pulse has a round-trip between the LiDAR system and the object, the distance can be determined according to Equation (2). In some alternative embodiments, in combined steps S608 and S610, processor 304 may determine the distance using the determined included angle, the angular velocity of the scanning mirror, and the speed of light according to Equation (3).

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A range estimation method for an optical sensing system, comprising:
   receiving, by an optical detector array including a plurality of detector elements, a laser pulse returned from an object, wherein the returned laser pulse has a single wavelength;
   measuring an intensity of the laser pulse by each detector element of the optical detector array, wherein each intensity is associated with a portion of a light spot of the returned laser pulse falling on each corresponding detector element among a plurality of neighboring detector elements;
   calculating an intensity-related value, by a processor, based on a sum of the intensities of the returned laser pulse measured using the plurality of neighboring detector elements;
   determining, by the processor, a traveling time of the laser pulse, by the processor, based on the calculated intensity-related value; and
   estimating, by the processor, a range between the object and the optical sensing system, by the processor, based on the traveling time of the laser pulse.

2. The range estimation method of claim 1, wherein the returned laser pulse is received by at least two adjacent detector elements in the optical detector array.

3. The range estimation method of claim 1, wherein the intensities of the returned laser pulse include a first intensity measured by a first detector element of the optical detector array and a second intensity measured by a second detector element of the optical detector array.

4. The range estimation method of claim 3, wherein calculating the intensity-related value further comprising:
   calculating a difference between the first intensity and the second intensity;
   calculating a sum of the first intensity and the second intensity; and
   calculating the intensity-related value as a ratio between the calculated difference and the calculated sum.

5. The range estimation method of claim 1, further comprising reflecting the laser pulse returned from the object, by a scanner rotating at a predetermined angular velocity, towards the optical detector array.

6. The range estimation method of claim 5, wherein determining the traveling time of the laser pulse further comprising:
   determining an angle based on the intensity-related value; and
   determining the traveling time of the laser pulse based on the determined angle and the predetermined angular velocity of the scanner.

7. The range estimation method of claim 6, wherein determining an angle further comprising:
   determining the angle using a look-up table based on the intensity-related value.

8. The range estimation method of claim 7, wherein determining an angle further comprising:
   select the look-up table from a plurality of predetermined look-up tables, each look-up table is determined for a selected group of detector elements in the optical detector array.

9. A range estimation system for an optical sensing system, comprising:
   an optical detector array configured to receive a laser pulse returned from an object, wherein the optical detector array includes a plurality of detector elements each configured to measure an intensity of the returned laser pulse, wherein the returned laser pulse has a single wavelength; and
   a processor, configured to:
      calculate an intensity-related value based on a sum of the intensities of the returned laser pulse measured using a plurality of neighboring detector elements, wherein each intensity is associated with a portion of a light spot of the returned laser pulse falling on each corresponding detector element among the plurality of neighboring detector elements;
      determine a traveling time of the laser pulse based on the calculated intensity-related value; and
      estimate a range between the object and the optical sensing system based on the traveling time of the laser pulse.

10. The range estimation system of claim 9, wherein the optical sensing system includes an emitter configured to emit the laser pulse at a laser pulse emitting rate and an analog to digital converter (ADC) with a sampling rate greater or equal to the laser pulse emitting rate.

11. The range estimation system of claim 9, wherein the returned laser pulse is received by at least two adjacent detector elements in the optical detector array.

12. The range estimation system of claim 9, wherein the intensities of the returned laser pulse include a first intensity measured by a first detector element of the optical detector array and a second intensity measured by a second detector element of the optical detector array.

13. The range estimation system of claim 12, wherein to calculate the intensity-related value, the processor is further configured to:
   calculate a difference between the first intensity and the second intensity;
   calculate a sum of the first intensity and the second intensity; and
   calculate the intensity-related value as a ratio between the calculated difference and the calculated sum.

14. The range estimation system of claim 9, further comprising:
   a scanner configured to rotate at a predetermined angular velocity and reflect the laser pulse returned from the object towards the optical detector array.

15. The range estimation system of claim 14, wherein to determine the traveling time of the laser pulse, the processor is further configured to:
   determine an angle based on the intensity-related value; and
   determine the traveling time of the laser pulse based on the determined angle and the predetermined angular velocity of the scanner.

16. The range estimation system of claim 15, wherein to determine the angle, the processor is further configured to:
   determine the angle using a look-up table based on the intensity-related value.

17. The range estimation system of claim 16, wherein to determine the angle, the processor is further configured to:
   select the look-up table from a plurality of predetermined look-up tables, each look-up table is determined for a selected group of detector elements in the optical detector array.

18. An optical sensing system, comprising:
   a scanner configured to transmit an emitted laser pulse towards an object and reflect the laser pulse returned from the object to an optical detector array, wherein the returned laser pulse has a single wavelength;
   the optical detector array comprising a plurality of detector elements each configured to measure an intensity of the returned laser pulse, wherein each intensity is associated with a portion of a light spot of the returned laser pulse falling on each corresponding detector element among a plurality of neighboring detector elements; and
   a processor, configured to:
      calculate an intensity-related value based on a sum of intensities of the returned laser pulse measured using the plurality of neighboring detector elements;
      determine a traveling time of the laser pulse based on the calculated intensity-related value; and
      estimate a range between the object and the optical sensing system based on the traveling time of the laser pulse.

19. The optical sensing system of claim 18, wherein the returned laser pulse is received by at least two adjacent detector elements in the optical detector array.

20. The optical sensing system of claim 18, wherein the intensities of the returned laser pulse include a first intensity measured by a first detector element of the optical detector array and a second intensity measured by a second detector element of the optical detector array.

* * * * *